(12) United States Patent
Verseman et al.

(10) Patent No.: US 12,516,994 B2
(45) Date of Patent: Jan. 6, 2026

(54) AFTERTREATMENT SYSTEM WITH TUBE ASSEMBLY FOR PRESSURE SENSING

(71) Applicant: Cummins Emission Solutions Inc., Columbus, IN (US)

(72) Inventors: Corey Verseman, Fitchburg, WI (US); Tyler Kent Lorenz, McFarland, WI (US)

(73) Assignee: Cummins Emission Solutions Inc., Columbus, IN (US)

( * ) Notice: Subject to any disclaimer, the term of this patent is extended or adjusted under 35 U.S.C. 154(b) by 371 days.

(21) Appl. No.: 18/120,043

(22) Filed: Mar. 10, 2023

(65) Prior Publication Data

US 2024/0302238 A1 Sep. 12, 2024

(51) Int. Cl.
*G01L 19/00* (2006.01)
*F01N 13/00* (2010.01)

(52) U.S. Cl.
CPC ........ *G01L 19/0007* (2013.01); *F01N 13/008* (2013.01)

(58) Field of Classification Search
CPC . G01L 19/0007; G01L 19/003; F01N 13/008; F01N 3/021; F01N 3/10; F01N 2560/08
See application file for complete search history.

(56) References Cited

U.S. PATENT DOCUMENTS

| | | | |
|---|---|---|---|
| 4,622,850 A | 11/1986 | Gaffrig | |
| 6,116,224 A | 9/2000 | Cook et al. | |
| 7,406,879 B1 * | 8/2008 | Adams | F01N 11/002 |
| | | | 73/861.52 |
| 8,057,741 B2 * | 11/2011 | Gustin | F01N 13/008 |
| | | | 422/94 |
| 8,240,216 B2 | 8/2012 | Kurtz et al. | |
| 8,549,847 B2 * | 10/2013 | Kamiya | B01D 46/448 |
| | | | 60/299 |
| 10,502,658 B2 * | 12/2019 | Carremm | G01M 15/106 |
| 10,704,437 B2 * | 7/2020 | Car | F01N 3/021 |
| 11,131,224 B1 * | 9/2021 | Dea | F01N 13/08 |

(Continued)

OTHER PUBLICATIONS

International Search Report and Written Opinion on PCT/US2024/018833 dated Sep. 3, 2024.

(Continued)

*Primary Examiner* — Freddie Kirkland, III
(74) *Attorney, Agent, or Firm* — Foley & Lardner LLP

(57) ABSTRACT

An aftertreatment system includes a housing and a tube assembly. The housing has a peripheral wall including an outer surface, an inner surface defining a passage configured to receive a flow of exhaust gas, and a peripheral wall aperture. The tube assembly includes a fitting assembly and a conveying tube. The fitting assembly includes a fitting body and a fitting tube. The fitting body includes a fitting body aperture, an upper surface, and a lower surface. The fitting body is inserted within the peripheral wall aperture and coupled to the outer surface. The fitting tube extends from the lower surface and is disposed in the passage and includes a fitting tube aperture at an inner end. The conveying tube is positioned partially within the fitting body aperture and extends outward from the fitting body and includes a conveying tube aperture at an inner end.

20 Claims, 16 Drawing Sheets

(56) References Cited

U.S. PATENT DOCUMENTS

| | | | |
|---|---|---|---|
| 2006/0042946 A1* | 3/2006 | Tsukahara | G01N 27/4077 |
| | | | 204/426 |
| 2007/0272032 A1 | 11/2007 | Adams et al. | |
| 2011/0296924 A1* | 12/2011 | Kurtz | G01L 19/0609 |
| | | | 29/595 |
| 2012/0237402 A1 | 9/2012 | Cantarelli et al. | |
| 2018/0320570 A1* | 11/2018 | Car | F01N 13/008 |
| 2019/0078977 A1* | 3/2019 | Carremm | F01N 13/008 |

OTHER PUBLICATIONS

Paragon Machine Works, "MS0089: 14" x 1-1/2" x 1-1/8" Titanium Tapered Steerer (Non-Stock Size)" (available at https://www.paragonmachineworks.com/ms0089-14-x-1-1-2-x-1-1-8-titanium-tapered-steerer-non-stock-size.html) (last accessed Mar. 10, 2023).

* cited by examiner

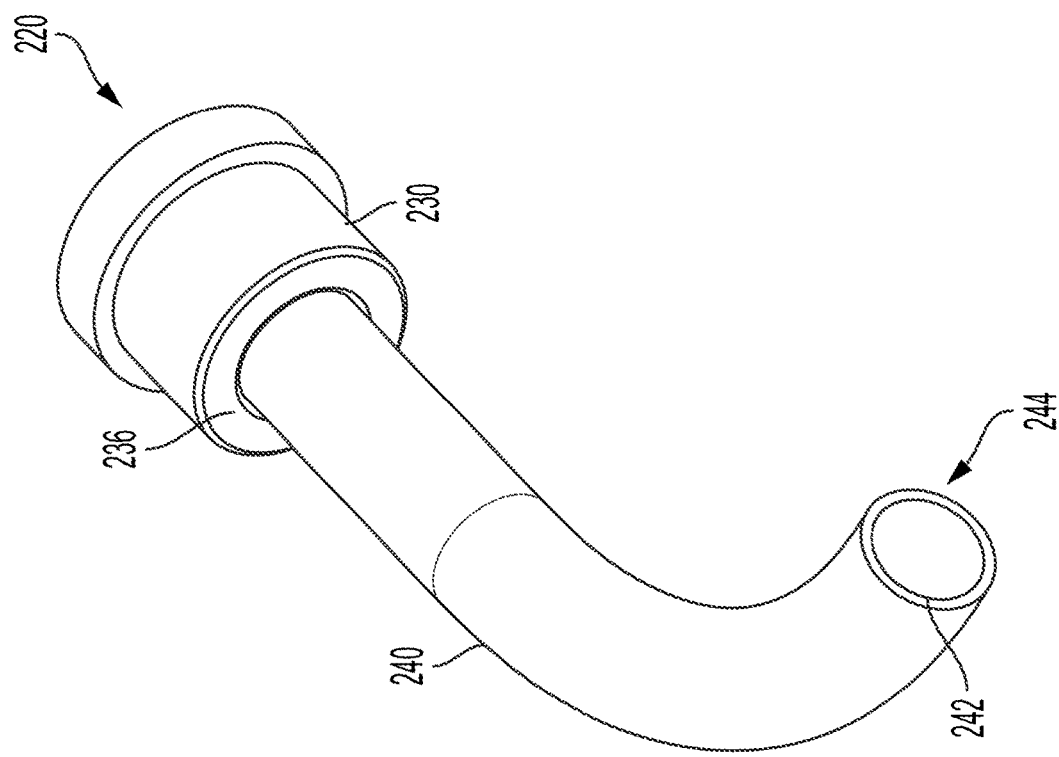

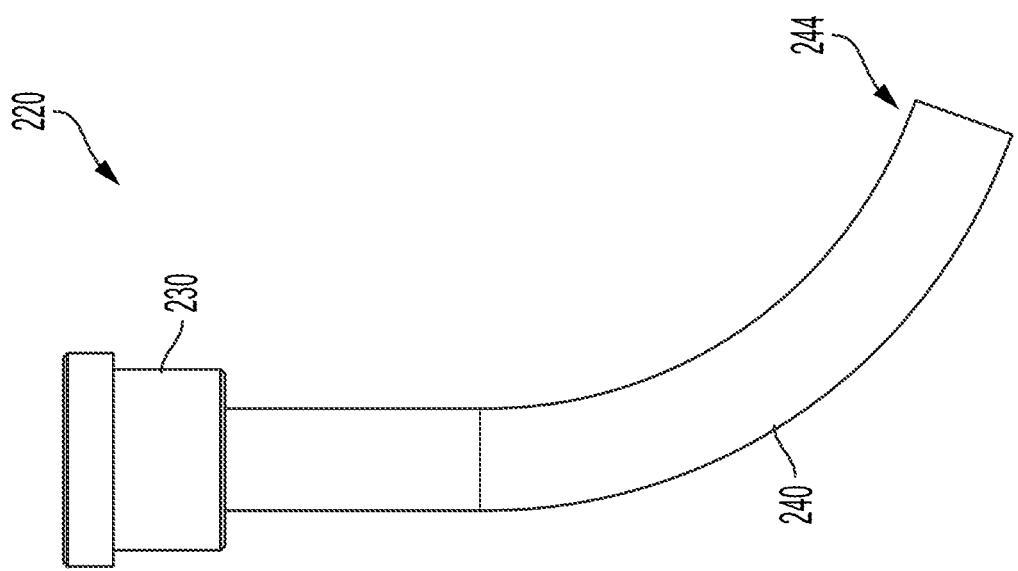
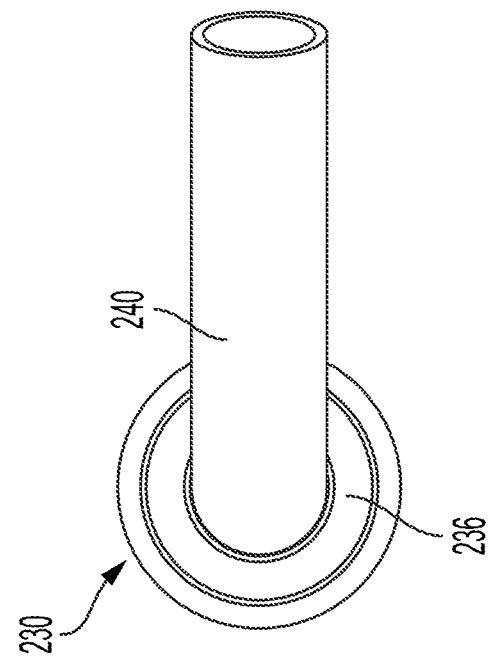

AFTERTREATMENT SYSTEM WITH TUBE ASSEMBLY FOR PRESSURE SENSING

TECHNICAL FIELD

The present disclosure relates generally to systems and devices for sensing pressure of an exhaust gas in an aftertreatment system of an internal combustion engine system.

BACKGROUND

For internal combustion engine systems, such as diesel engine systems, pressure sensors may be used in various applications in an aftertreatment system to measure the pressure (e.g., static pressure) of exhaust gas. In some applications, for example, it may be desirable to use a pressure sensor to measure the backpressure caused by a particulate filter, such as a diesel particulate filter (DPF). A particulate filter is utilized to remove particulate matter (PM) (e.g., soot particles, carbon, ash, metallic abrasion particles, sulfates, and silicates) from exhaust gas. By measuring the backpressure proximate the particulate filter, proper functioning of the aftertreatment system may be maintained.

Pressure measurements may be obtained using a conveying tube that extends into an exhaust conduit and routes exhaust gas to a pressure sensor. The conveying tube may be inserted deep into the exhaust conduit to increase accuracy of pressure readings.

SUMMARY

When a conveying tube is used for pressure measurements, the insertion depth of the conveying tube dictates an amount of space (e.g., clearance, etc.) required to remove, service, or install a conveying tube. Depending on an arrangement of surrounding components, the amount of space available for facilitating removal, service, or installation of the pressure sampling tube may be limited. Embodiments of the present disclosure address this problem.

In one embodiment, an aftertreatment system includes a housing and a tube assembly. The housing has a peripheral wall including an outer surface and an inner surface. The inner surface defines a passage configured to receive a flow of exhaust gas. The peripheral wall also includes a peripheral wall aperture. The tube assembly includes a fitting assembly and a conveying tube. The fitting assembly includes a fitting body and a fitting tube. The fitting body includes a fitting body aperture, an upper surface, and a lower surface. The fitting body is inserted within the peripheral wall aperture and coupled to the outer surface. The fitting tube extends from the lower surface and is disposed in the passage and includes a fitting tube aperture at an inner end of the fitting tube. The conveying tube is positioned partially within the fitting body aperture and extends outward from the fitting body and includes a conveying tube aperture at an inner end of the conveying tube.

In another embodiment, a tube assembly for pressure sensing includes a fitting body, a coupling tube, and a nut. The fitting assembly includes a fitting body and a fitting tube. The fitting body includes a fitting body aperture, an upper surface, and a lower surface. The fitting tube extends from the lower surface and includes a fitting tube aperture at an inner end of the fitting tube. The inner end is distal the fitting body. The coupling tube includes a flared end. The nut is disposed between the coupling tube and the fitting body and is configured to be threadably coupled to the fitting body so as to compress the flared end against the fitting body.

In yet another embodiment, a fitting assembly for a tube assembly for pressure sensing includes a fitting body, a fitting tube, and a nut. The fitting body includes a fitting body aperture, an upper surface, a lower surface, and an inner surface. The fitting body aperture is not threaded. The inner surface includes a fitting threaded portion. The fitting tube extends from the lower surface and includes a fitting tube aperture at an inner end of the fitting tube. The inner end is distal the fitting body. The nut includes a nut insert portion and a nut aperture. The nut insert portion includes a nut threaded portion that is configured to be threadably coupled to the fitting threaded portion. The nut aperture is not threaded and is configured to be aligned with the fitting body aperture when the nut threaded portion is threadably coupled to the fitting threaded portion.

BRIEF DESCRIPTION OF THE DRAWINGS

FIG. 22 is a perspective view of another example fitting assembly for a tube assembly;

FIG. 23 is a bottom view of the fitting assembly shown in FIG. 22; and

FIG. 24 is a side view of the fitting assembly shown in FIG. 22.

DETAILED DESCRIPTION

Figure 1:
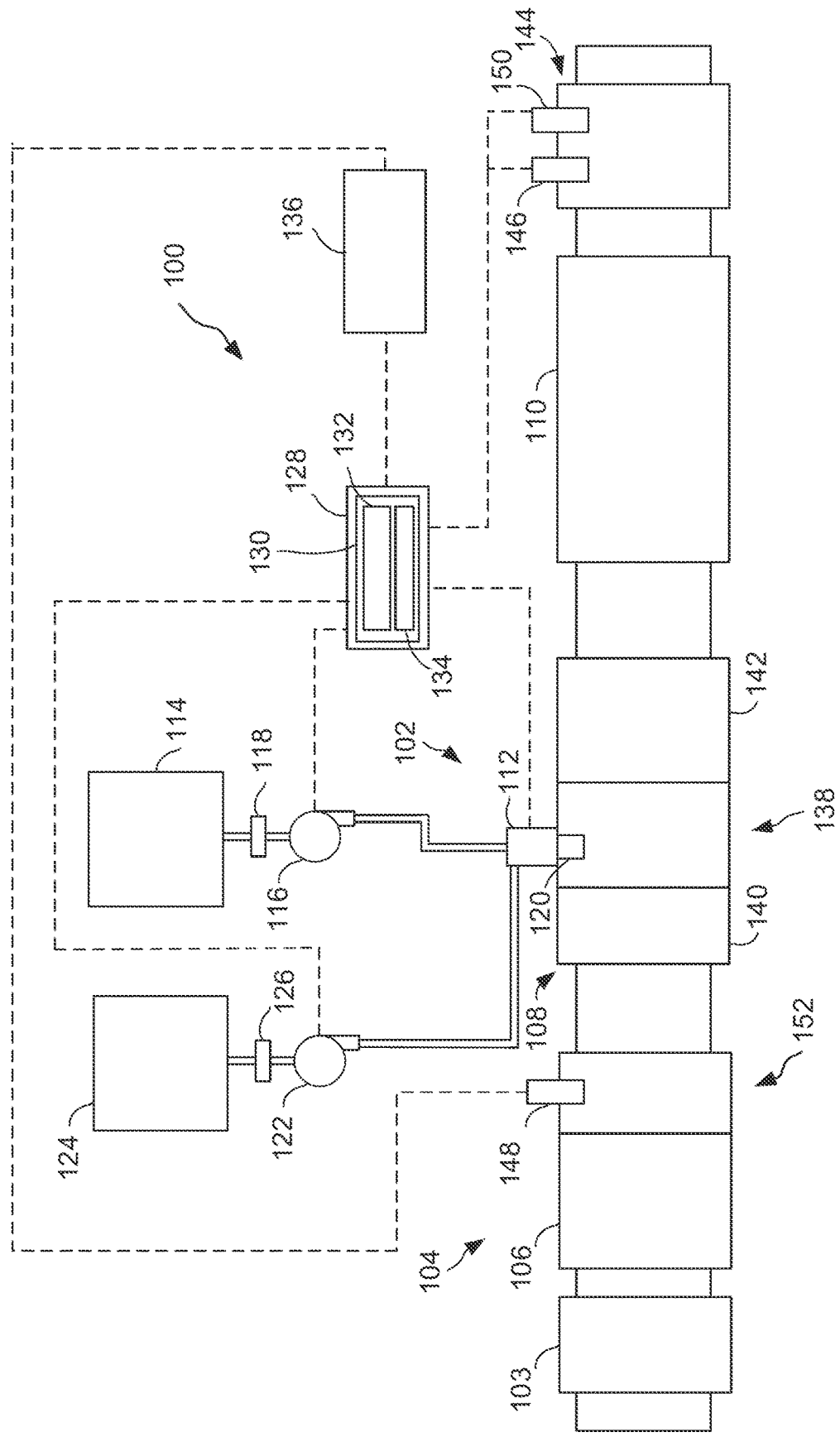
FIG. 1 is a block schematic diagram of an example aftertreatment system.

Following below are more detailed descriptions of various concepts related to, and implementations of, methods, apparatuses, and for sampling exhaust gas in an aftertreatment system of an internal combustion engine system. The various concepts introduced above and discussed in greater detail below may be implemented in any of a number of ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust gas that contains particulate matter. In some applications, a sensor monitors the amount of the particulate matter. When the amount of particulate matter is above a threshold, for example in a diesel particulate filter (DPF), the sensor signals to a controller (e.g., engine control unit (ECU) to begin a regeneration process (e.g., injecting fuel into the exhaust system) to burn off and clear the particulate matter.

Monitoring of the exhaust gas may be achieved by sampling the exhaust gas flow within the aftertreatment system using various sensors, such as a pressure sensor. Sampling is performed using a tube that samples the exhaust gas flow and conveys exhaust gas to a pressure sensor to measure the pressure of the exhaust gas in the tube. The conveying tube extends into a passage within which exhaust gas flows. The pressure of the exhaust gas within the conveying tube changes such that the pressure of the exhaust gas within the conveying tube corresponds to the pressure of the sampled exhaust flow. Over time, the conveying tube can fail due to corrosion, cracks, blockages, and other failures. Therefore, service (e.g., repair, replace, remove, install, etc.) of the conveying tube may be desired. Typical conveying tubes require an amount of space available outside of the aftertreatment system equivalent to an insertion depth of the conveying tube in order to remove and service the conveying tube. However, as aftertreatment systems become increasingly large and complex, the available space available around the aftertreatment system is becoming scarcer. As a result, conveying tubes may require more space to service than is available, reducing serviceability. In such situations, service procedures may require the removal of the exhaust system, or additional nearby non-exhaust related components. In some instances, servicing may be omitted altogether and the entire exhaust assembly may be replaced.

Pressure sensors may need conveying tubes extending in various positions and depths depending on constraints associated with a particular application. For example, some applications require conveying tubes to be inserted deep into the passage within which exhaust flows, such as into the center of the exhaust flow, in order to reduce the effects of thermophoresis and facilitate more uniform pressure reading. Thermophoresis is the transport force that occurs due to the presence of a temperature gradient. This can cause exhaust particulate particles less than 10 μm in diameter to migrate to lower temperature regions in the conveying tube. Thermophoresis can cause the formation of deposits in conveying tubes, resulting in blockages and inaccurate pressure readings by the pressure sensor. However, the amount of space needed to service these conveying tubes may exceed the space available, resulting in undesirable service procedures, such as removing the entire DPF system or the driveshaft of a vehicle, increasing service time and cost to service. As a result, it is important that adequate insertion depth is maintained to reduce thermophoretic forces while minimizing the required space to service a conveying tube.

Implementations described herein are related to a tube assembly including a fitting assembly that extends into a passage within which exhaust gas flows and a conveying tube inserted within the fitting assembly to sample the exhaust gas for a pressure sensor. As a result, the tube assembly described herein is capable of sampling exhaust gas while reducing the amount of space required to service the conveying tube, thereby improving serviceability, particularly in applications with limited space.

II. Example Aftertreatment System

FIG. 1 depicts an aftertreatment system 100 having an example reductant delivery system 102 for an exhaust conduit system 104. The aftertreatment system 100 includes the reductant delivery system 102, a particulate filter (e.g., a diesel particulate filter (DPF)) 106, a regeneration device 103, a pressure sensing assembly 152, a decomposition chamber 108 (e.g., reactor, reactor pipe, etc.), and a selective catalytic reduction (SCR) catalyst 110.

The DPF 106 is configured to remove particulate matter, such as soot, from exhaust gas flowing in the exhaust conduit system 104. The DPF 106 includes an inlet, where the exhaust gas is received, and an outlet, where the exhaust gas exits after having particulate matter substantially filtered from the exhaust gas and/or converting the particulate matter into carbon dioxide.

The regeneration device 103 is configured to initiate a process to regenerate the DPF 106 by injecting a hydrocarbon fluid (e.g., fuel, oil, etc.) into the exhaust flow to heat the exhaust flow. Periodic regeneration of the DPF 106 is required for proper operation. The regeneration device 103 is fluidly coupled to the exhaust conduit system 104 upstream of the DPF 106. The regeneration device 103 may burn off accumulated soot in the DPF 106 to reduce harmful exhaust emissions and facilitate prolonged operation of the DPF 106 for engine efficiency. In various embodiments, the regeneration device 103 may be coupled to a catalyst, such as a diesel oxidation catalyst (DOC) to oxidize hydrocarbons and carbon monoxide in the exhaust gas and generate heat to regenerate the DPF 106. In various embodiments, the regeneration device 103 may include an injector (e.g., fuel injector, hydrocarbon injector, etc.). In these embodiments, the regeneration device 103 may also include an ignitor (e.g., spark plug, etc.) that is configured to facilitate combustion of injected hydrocarbon fluid. In some embodiments, the regeneration device 103 is or includes an electric heater (e.g., resistance heater, etc.).

The pressure sensing assembly 152 is configured to facilitate measurement of a pressure of the exhaust gas. In various embodiments, the pressure sensing assembly 152 is positioned downstream of the DPF 106. However, in other embodiments the pressure sensing assembly 152 is additionally or alternatively positioned upstream of the DPF 106.

The pressure sensing assembly 152 may include a pressure sensor 148. The pressure sensor 148 is configured to monitor and measure the static pressure of exhaust gas flowing through the pressure sensing assembly 152. The pressure sensor 148 may measure backpressure caused by an exhaust aftertreatment device, such as the DPF 106. In some embodiments, the pressure sensor 148 is a differential pressure sensor connected to the DPF 106 via two conduits (e.g., hoses, tubes, etc.), one connecting upstream of the DPF 106, and the other downstream of the DPF 106. The differential pressure sensor may measure and compare the difference in pressure of the exhaust gas before and after the DPF 106 to estimate the amount of particulate matter trapped in the DPF 106. As soot accumulates in the DPF 106, the pressure difference between a pressure of the exhaust gas on the inlet side and a pressure of the exhaust gas on the outlet side of the DPF 106 increases.

The pressure sensor 148 is configured to communicate with a central controller 136 (e.g., engine control unit (ECU)), engine control module (ECM), etc.) of an internal combustion engine having the aftertreatment system 100. The pressure sensor 148 communicates data to the central controller 136, which will interpret the data to determine when to trigger regeneration through the regeneration device 103.

FIGS. 2-9 illustrate the pressure sensing assembly 152 in greater detail according to various embodiments. The pressure sensing assembly 152 includes a tube assembly 200 including fitting assembly 220. FIGS. 10-24 illustrate the fitting assembly 220, or portions of the fitting assembly 220, in greater detail according to various embodiments. As is explained in more detail herein, the pressure sensing assembly 152 is configured to facilitate sampling of the exhaust gas flowing through the pressure sensing assembly 152 such that a pressure sensor can measure pressure of the exhaust gas. The pressure sensing assembly 152 is structured such that the insertion depth of a conveying tube into the exhaust flow to sample the exhaust gas is reduced. In some applications, servicing of a conveying tube can become difficult when an amount of external space required to service the conveying tube is not available (e.g., tight spaces), because removing the conveying tube may require removal of the exhaust system or removal of additional nearby components, such as the DPF 106. Therefore, the pressure sensing assembly 152 offers benefits over other systems that do not minimize the required external space to service the conveying tube.

The decomposition chamber 108 is configured to convert a reductant into ammonia. The reductant may be, for example, urea, diesel exhaust fluid (DEF), Adblue®, a urea water solution (UWS), an aqueous urea solution (e.g., AUS32, etc.), and other similar fluids. The decomposition chamber 108 includes an inlet fluidly coupled to (e.g., fluidly configured to communicate with, etc.) the DPF 106 to receive the exhaust gas and an outlet for the exhaust gas, ammonia, and/or reductant to flow to the SCR catalyst 110.

The reductant delivery system 102 includes a dosing module 112 (e.g., doser, etc.) configured to dose the reductant into the decomposition chamber 108 (e.g., via an injector). The dosing module 112 is mounted to the decomposition chamber 108 such that the dosing module 112 may dose the reductant into the exhaust gas flowing in the exhaust conduit system 104. The dosing module 112 may include an insulator interposed between a portion of the dosing module 112 and the portion of the decomposition chamber 108 on which the dosing module 112 is mounted.

The dosing module 112 is fluidly coupled to a reductant source 114. The reductant source 114 may include multiple reductant sources 114. The reductant source 114 may be, for example, a diesel exhaust fluid tank containing Adblue®. A reductant pump 116 (e.g., supply unit, etc.) is used to pressurize the reductant from the reductant source 114 for delivery to the dosing module 112. In some embodiments, the reductant pump 116 is pressure controlled (e.g., controlled to obtain a target pressure, etc.). The reductant pump 116 includes a reductant filter 118. The reductant filter 118 filters (e.g., strains, etc.) the reductant prior to the reductant being provided to internal components (e.g., pistons, vanes, etc.) of the reductant pump 116.

The dosing module 112 includes at least one injector 120. Each injector 120 is configured to dose the reductant into the exhaust gas (e.g., within the decomposition chamber 108, etc.). In some embodiments, the reductant delivery system 102 also includes an air pump 122. In these embodiments, the air pump 122 draws air from an air source 124 (e.g., air intake, etc.) and through an air filter 126 disposed upstream of the air pump 122. Additionally, the air pump 122 provides the air to the dosing module 112 via a conduit. In these embodiments, the dosing module 112 is configured to mix the air and the reductant into an air-reductant mixture and to provide the air-reductant mixture into the decomposition chamber 108. In other embodiments, the reductant delivery system 102 does not include the air pump 122 or the air source 124. In such embodiments, the dosing module 112 is not configured to mix the reductant with air.

The dosing module 112 and the reductant pump 116 are also electrically or communicatively coupled to a reductant delivery system controller 128. The reductant delivery system controller 128 is configured to control the dosing module 112 to dose the reductant into the decomposition chamber 108. The reductant delivery system controller 128 may also be configured to control the reductant pump 116.

The reductant delivery system controller 128 includes a processing circuit 130. The processing circuit 130 includes a processor 132 and a memory 134. The processor 132 may include a microprocessor, an application-specific integrated circuit (ASIC), a field-programmable gate array (FPGA), etc., or combinations thereof. The memory 134 may include, but is not limited to, electronic, optical, magnetic, or any other storage or transmission device capable of providing a processor, ASIC, FPGA, etc. with program instructions. This memory 134 may include a memory chip, Electrically Erasable Programmable Read-Only Memory (EEPROM), Erasable Programmable Read Only Memory (EPROM), flash memory, or any other suitable memory from which the reductant delivery system controller 128 can read instructions. The instructions may include code from any suitable programming language. The memory 134 may include various modules that include instructions which are configured to be implemented by the processor 132. In various embodiments, the reductant delivery system controller 128 is configured to communicate with the central controller 136. In some embodiments, the central controller 136 and the reductant delivery system controller 128 are integrated into a single controller.

In some embodiments, the central controller 136 is communicable with a display device (e.g., screen, monitor, touch screen, heads up display (HUD), indicator light, etc.). The display device may be configured to change state in response to receiving information from the central controller 136. For example, the display device may be configured to change between a static state (e.g., displaying a green light, displaying a "SYSTEM OK" message, etc.) and an alarm state (e.g., displaying a blinking red light, displaying a "SERVICE NEEDED" message, etc.) based on a communication from the central controller 136. By changing state, the display device may provide an indication to a user (e.g., operator, etc.) of a status (e.g., operation, in need of service, etc.) of the reductant delivery system 102.

The decomposition chamber 108 is located upstream of the SCR catalyst 110. As a result, the reductant is injected upstream of the SCR catalyst 110 such that the SCR catalyst 110 receives a mixture of the reductant and exhaust gas. The reductant droplets undergo the processes of evaporation, thermolysis, and hydrolysis to form non-NOx emissions (e.g., gaseous ammonia, etc.) within the exhaust conduit system 104.

The SCR catalyst 110 is configured to assist in the reduction of NOx emissions by accelerating a NOx reduction process between the ammonia and the NOx of the exhaust gas into diatomic nitrogen, water, and/or carbon dioxide. The SCR catalyst 110 includes an inlet fluidly coupled to the decomposition chamber 108 from which exhaust gas and reductant are received and an outlet fluidly coupled to an end of the exhaust conduit system 104.

In some implementations, the DPF 106 may be positioned downstream of the decomposition chamber 108. For instance, the DPF 106 and the SCR catalyst 110 may be combined into a single unit. In some implementations, the dosing module 112 may instead be positioned downstream of a turbocharger or upstream of a turbocharger.

In various embodiments, the aftertreatment system 100 also includes a mixing assembly 138 (e.g., mixer, multi-stage mixer, etc.). The mixing assembly 138 is disposed between a decomposition chamber upstream portion 140 and a decomposition chamber downstream portion 142. Together, the decomposition chamber upstream portion 140, the mixing assembly 138, and the decomposition chamber downstream portion 142, form the decomposition chamber 108. The dosing module 112 is coupled to the mixing assembly 138 and the injector 120 is configured to dose the reductant into the mixing assembly 138. As will be explained in more detail herein, the mixing assembly 138 functions to mix the exhaust gas received from the decomposition chamber upstream portion 140 with the reductant provided by the mixing assembly 138 and provide the decomposition chamber downstream portion 142 with exhaust gas that have been mixed with the reductant.

While the aftertreatment system 100 has been shown and described in the context of use with a diesel internal combustion engine, it is understood that the aftertreatment system 100 may be used with other internal combustion engines, such as gasoline internal combustion engines, hybrid internal combustion engines, propane internal combustion engines, and other similar internal combustion engines. In addition, other components or devices, not shown, may be included in the aftertreatment system 100.

III. First Example Pressure Sensing Assembly

Figure 2:
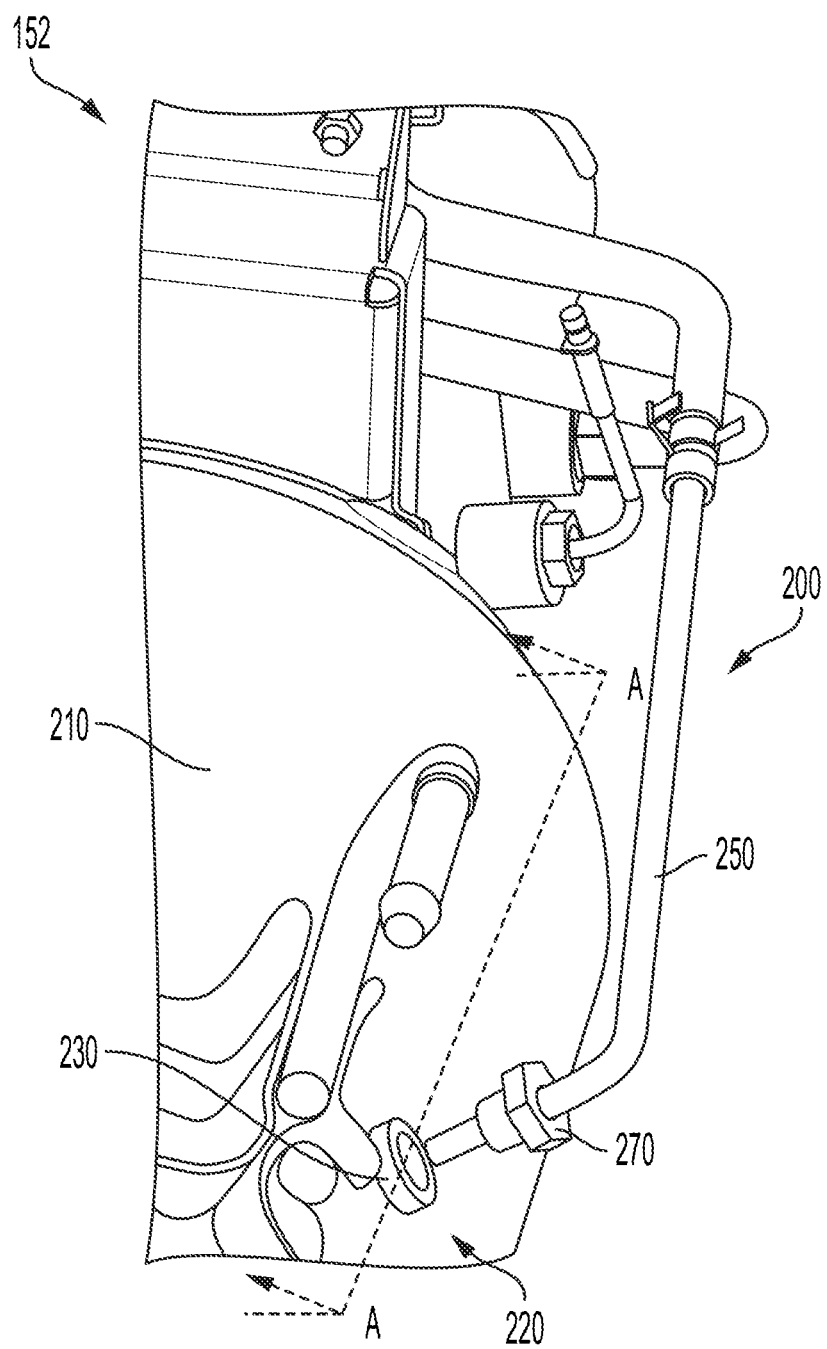
FIG. 2 is a perspective view of a portion of an aftertreatment system including an example pressure sensing assembly with the tube assembly shown partially removed from a housing of the pressure sensing assembly.
Figure 3:
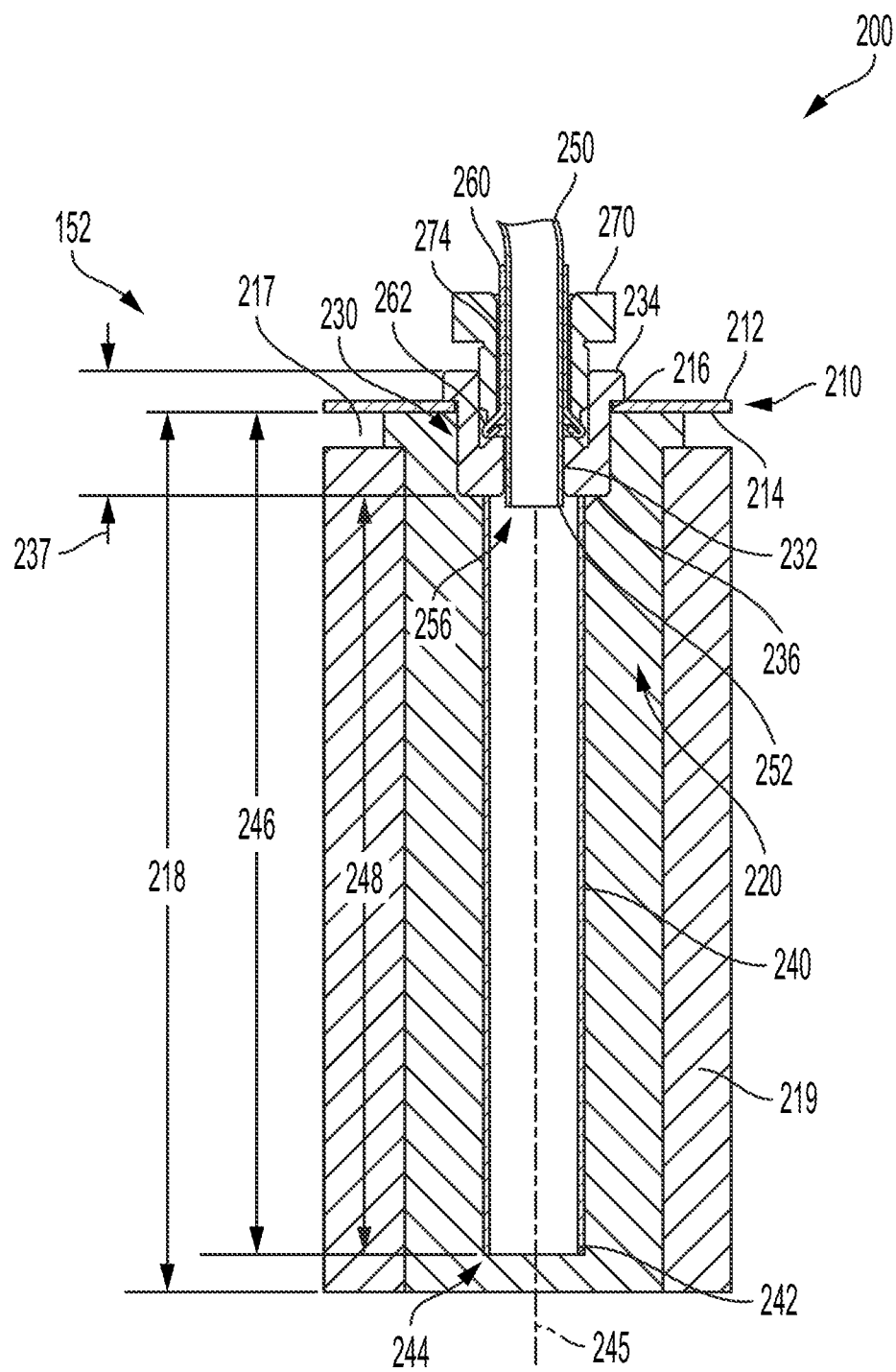
FIG. 3 is a cross-sectional view of a portion of the aftertreatment system shown in FIG. 2, taken along plane A-A, according to various embodiments.
Figure 4:
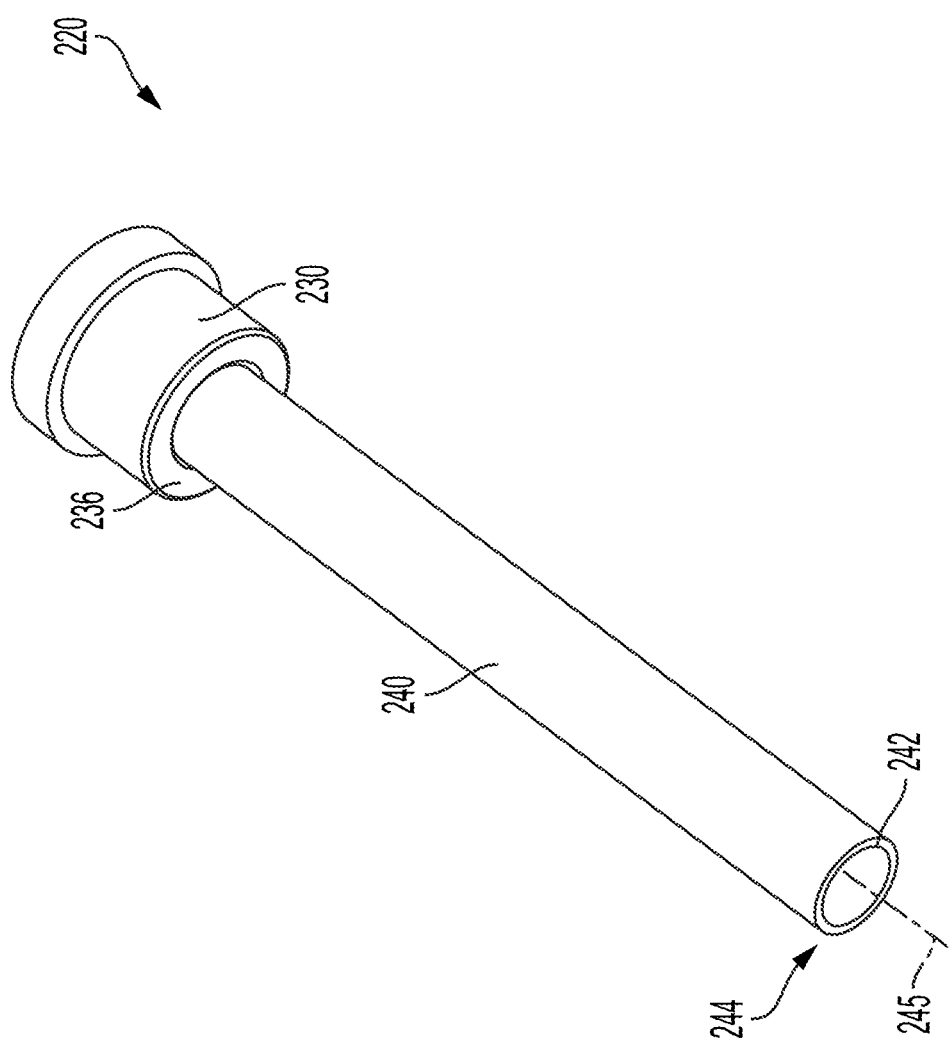
FIG. 4 is a perspective view of the fitting assembly of the tube assembly shown in FIG. 3.
Figure 6:
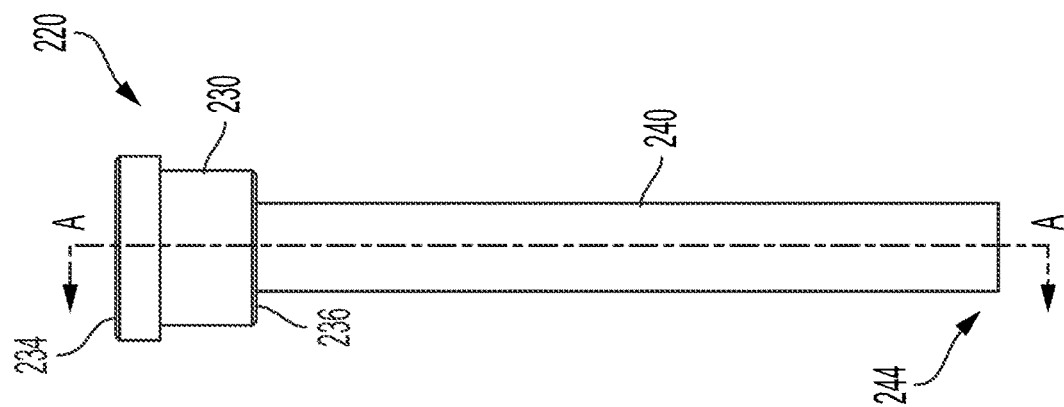
FIG. 6 is a front view of the fitting assembly shown in FIG. 4.
Figure 5:
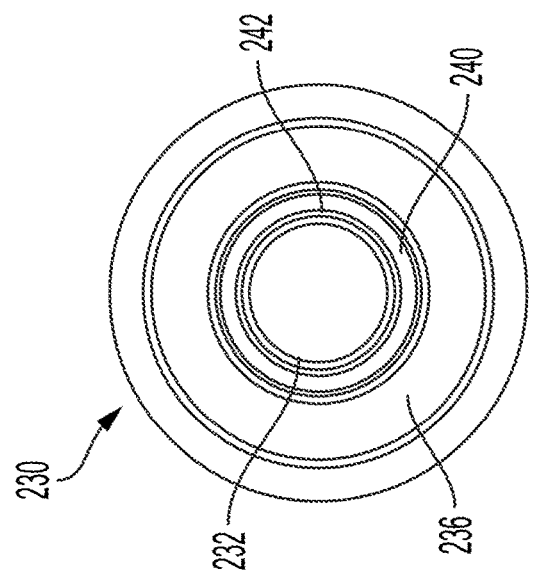
FIG. 5 is a bottom view of the fitting assembly shown in FIG. 4.
Figure 7:
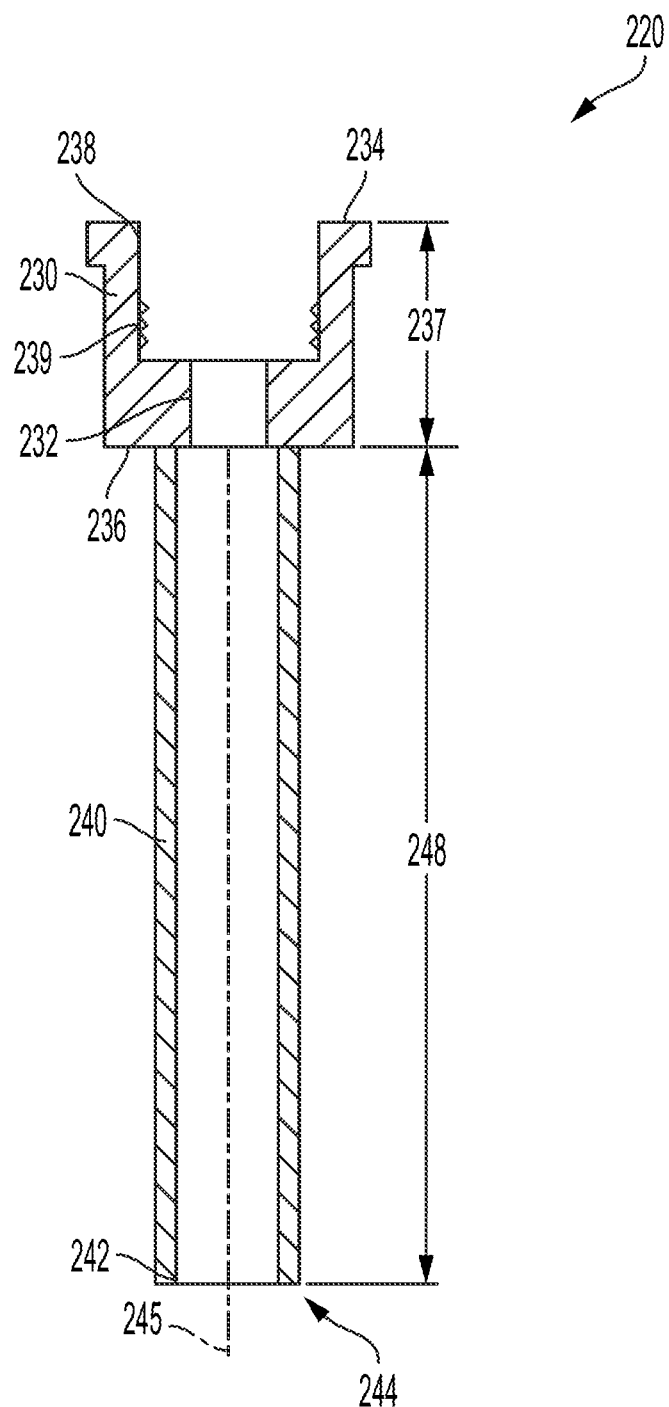
FIG. 7 is a cross-sectional view of the fitting assembly shown in FIG. 4, taken along plane A-A.

FIGS. 2-3 illustrate an example pressure sensing assembly 152. The pressure sensing assembly 152 facilitates the measurement of a pressure of exhaust gas in an aftertreatment system. As exhaust gas flows through the aftertreatment system, it may be desirable to measure and monitor exhaust backpressure, as increased backpressure levels can cause increased emissions and fuel consumption and negatively impact engine performance.

The pressure sensing assembly 152 includes a housing 210. The housing 210 is configured to house a plurality of exhaust aftertreatment components, such as a catalyst or the DPF 106. The housing 210 has a peripheral wall and is configured to receive exhaust gas through an inlet. The exhaust gas exits the housing 210 through an outlet. The peripheral wall includes an outer surface 212 and an inner surface 214. Mounts, clamps, or fasteners may be attached to the outer surface 212 to couple the housing 210 to an upstream exhaust conduit at the inlet and a downstream exhaust conduit at the outlet. Other aftertreatment devices, such sensors, may be mounted onto the outer surface 212. The inner surface 214 defines a passage (e.g., cylindrical passage, cylindrical opening, etc.) within which the exhaust gas flows. The inner surface 214 further defines a width of the housing, with a length 218 in FIG. 3 showing half a width of the housing. The peripheral wall also includes a peripheral wall aperture 216 extending through the outer surface 212 and inner surface 214 of the peripheral wall.

In various embodiments, the dimensions and geometry of the housing 210 may accommodate the aftertreatment system and the components configured to be housed within the housing 210. In some embodiments, the housing 210 is disposed on top of (e.g., overlaps, covers, etc.) a casing 217. In some embodiments, the housing may be made of several sections.

The pressure sensing assembly 152 also includes a tube assembly 200. As the exhaust gas flows within the housing 210, the tube assembly 200 is configured to enable a pressure sensor to sample the exhaust gas flow by conveying exhaust gas to the pressure sensor. The tube assembly 200 includes a fitting assembly 220. FIGS. 4-7 show the fitting assembly 220 of FIGS. 2-3 in further detail. The fitting assembly 220 is disposed within the passage of the housing 210, and is coupled to the housing to provide a sampling location to enable the pressure sensor to measure pressure.

The fitting assembly 220 includes a fitting body 230. The fitting body 230 is inserted within the peripheral wall aperture 216 and is coupled (e.g., welded, threaded, fastened) to the outer surface 212 of the housing 210. The fitting body 230 is defined by a fitting body height 237 from an upper surface 234 of the fitting body 230 to a lower surface 236 of the fitting body 230. The upper surface 234 defines the top of the fitting body 230 and is disposed above the outer surface 212 of the housing 210. The lower surface 236 defines the bottom of the fitting body 230 and is disposed below the inner surface 214 of the housing 210. The fitting body 230 includes an inner surface 238 configured to receive and removably couple with at least one mounting component (e.g., threaded fastener, pins, clips, notches, keying feature, etc.). In some embodiments, the mounting component is a nut 270. In these embodiments, the fitting body 230 includes a fitting threaded portion 239 along a portion of the inner surface 238 to threadably couple with the nut 270. The fitting body 230 also includes a fitting body aperture 232 extending through the fitting body 230 from the lower surface 236 to the inner surface 238. The fitting body height 237 is sufficiently large to allow for space for the fitting body aperture 232 and the inner surface 238.

In various embodiments, the fitting body 230 is configured such that the upper surface 234 is substantially parallel to the outer surface 212 of the housing 210. In some embodiments, the fitting body 230 is configured such that the upper surface 234 and the lower surface 236 are substantially parallel to each other. In some embodiments, the fitting body 230 is configured such that the inner surface 238 is angled or tapered relative to the upper surface 234 such that a mounting component can be press fit into the fitting body 230.

In some embodiments, the fitting threaded portion 239 is located along the entire circumference of the inner surface 238. In some embodiments, the fitting threaded portion 239 is located only in a portion or portions of the circumference of the inner surface 238. For example, the fitting threaded portion 239 can be disposed along half of the circumference of the inner surface 238. In some embodiments, the fitting threaded portion 239 is disposed along the entire height of the inner surface 238. In some embodiments, the fitting threaded portion is disposed along a portion of the height of the inner surface 238.

The fitting assembly 220 also includes a fitting tube 240. The fitting tube 240 extends from the lower surface 236 of the fitting body 230 along a longitudinal axis 245 of the fitting tube 240 such that the fitting tube 240 is disposed in the passage of the housing 210. The fitting tube has a fitting tube length 248 from an inner end 244 of the fitting tube 240 located distal to the fitting body 230, to the lower surface 236 of the fitting body 230. The fitting tube 240 includes a fitting tube aperture 242 at the inner end 244 of the fitting tube 240 configured to sample the exhaust gas flow. The fitting tube 240 contains exhaust gas that is stagnant relative to the exhaust gas flow moving around the fitting tube 240. The exhaust gas within the fitting tube 240 compresses or decompresses based on the exhaust flow sampled via the fitting tube aperture 242 such that the exhaust gas pressure within the fitting tube 240 corresponds to the pressure of the exhaust gas flow. By configuring the fitting tube 240 to be located within the exhaust gas flow in the housing 210, the exhaust gas flow heats up the fitting tube 240 as it flows through the housing 210 to a temperature closer to the temperature of the exhaust gas flow and reduces the effects of thermophoresis on the fitting tube aperture 242. As a result, at an insertion depth 246 measured from the inner end 244 of the fitting tube 240 to the inner surface 214 of the housing 210, the fitting tube aperture 242 is less susceptible to the formation of particulate deposits/blockages and can facilitate more uniform and accurate pressure readings by a pressure sensor. Insertion depth largely depends on the application and configuration of the pressure sensing assembly 152, such as the diameter of the fitting tube 240. In various embodiments, the insertion depth is between 20% and 80% of the width of the housing. In these embodiments, the fitting tube 240 extends into the passage of the housing 210 such that deposit formation is reduced and pressure sensor performance is improved.

In various embodiments, the fitting body 230 is integrally formed with the fitting tube 240 (e.g., cast, machined etc.). In some embodiments, the fitting body 230 is integrally formed with the fitting tube via additive manufacturing. For example, the fitting assembly 220 may be integrally formed using 3D printing, selective laser sintering, selective laser melting (SLM), direct metal laser sintering (DMLS), electron beam melting (EBM), ultrasonic additive manufacturing (UAM), fused deposition modeling (FDM), fused filament fabrication (FFF), stereolithography (SLA), material jetting, binder jetting or other similar processes. The fitting body 220 may be formed as part of a single manufacturing step (e.g., 3D printing, selective laser sintering, SLM, DMLS, EBM, UAM, FDM, FFF, SLA, material jetting, binder jetting, etc.) to create a single-piece or unitary construction that cannot be disassembled without an at least partial destruction of the fitting assembly 220. In some embodiments, the fitting body 230 and the fitting tube 240 are separate pieces and coupled (e.g., threaded, welded, brazed, etc.) together.

The tube assembly 200 also includes a conveying tube 250. The conveying tube 250 is removably coupled to the fitting assembly 220. When coupled, the conveying tube 250 fluidly couples the exhaust gas within the fitting tube 240 to a pressure sensor. The pressure of the exhaust gas within the fitting tube 240 and the conveying tube 250 is the same. The conveying tube 250 includes a conveying tube aperture 252 at an inner end 256 of the conveying tube 250 distal to the fitting assembly 220. In various applications, it may be desirable to minimize the difference in width between the conveying tube aperture 252 and the fitting tube aperture 242 so as to avoid creating any sharp edges or shoulders that may collect particulates or create turbulent flow, resulting in disrupted exhaust gas flow. Typical conveying tubes are coupled (e.g., welded, brazed, threaded, etc.) to a housing and require a greater insertion depth into the housing (e.g., the length of the portion of the conveying tube extending into the housing) to sample the exhaust gas. In contrast, the conveying tube 250 may be positioned partially within the fitting body aperture 232 and does not couple to the outer surface 212 of the housing 210. As a result of the fitting assembly 220 extending into the housing 210 rather than the conveying tube 250 extending into the housing 210, the conveying tube 250 requires a shorter insertion depth compared to typical conveying tubes. By decreasing the insertion depth of the conveying tube 250, the amount of space required to service the conveying tube 250 is greatly reduced, improving serviceability.

In various embodiments, the conveying tube 250 is coupled to the fitting assembly 220 by a coupling tube 260 and the nut 270. The coupling tube 260 and nut 270 removably couple the conveying tube 250 to the fitting body 230 such that the exhaust gas flows into the conveying tube aperture 252 to convey the exhaust gas to a pressure sensor. As a result, when servicing the conveying tube 250, the conveying tube 250 may be easily removed independent of the fitting assembly 220. The coupling tube 260 is disposed around the exterior of the conveying tube 250 and includes a flared end 262 extending outwardly from its center. The flared end 262 is located on an end of the coupling tube 260 proximate to the fitting body 230. In some embodiments the coupling tube 260 may be welded or brazed onto the conveying tube 250. The nut 270 includes a nut aperture 274 configured to receive the coupling tube 260 such that the nut 270 sits on top of the flared end 262. When threadably coupled to the fitting body 230, the nut aperture 274 aligns with the fitting body aperture 232. The nut 270 also includes a nut threaded portion that is configured to be threadably coupled to the fitting threaded portion 239 along a portion of the inner surface 238 of the fitting body 230. To secure the conveying tube 250 to the fitting body 230, the nut 270 is threaded into the fitting body 230 such that the nut threaded portion engages with the fitting threaded portion 239 and compresses the flared end 262 against the inner surface 238 of the fitting body 230. As a result, the flared end 262 prevents exhaust gas flowing from the fitting tube 240 to the conveying tube 250 from escaping through the fitting body aperture 232.

In various embodiments, the conveying tube 250 is coupled to a pressure sensor coupling (e.g., joint, adapter, bushing, etc.) (not shown) at an end opposite the inner end 256. In some embodiments, the pressure sensor coupling is welded to the conveying tube 250. In other embodiments, the pressure sensor coupling is threaded into the conveying tube 250. In still other embodiments, the pressure sensor coupling is press fit (e.g., via a friction fit, etc.) into the conveying tube 250. The pressure sensor coupling includes a pressure sensor coupling opening configured to receive a pressure sensor such as the pressure sensor 148 of FIG. 1.

While the pressure sensing assembly 152 is shown and described as including the fitting tube 240 being circular with a constant diameter along the longitudinal axis 245 of the fitting tube 240, it is understood that the cross-sectional shape of the fitting tube 240 taken perpendicular to the longitudinal axis 245 of the fitting tube 240 may not be constant (e.g., tapered, or varied along the fitting tube 240, etc.). In addition, it is understood that the cross-sectional shape of the fitting tube 240 taken perpendicular to the longitudinal axis 245 of the fitting tube 240 may be oval-shaped or an otherwise commonly available tubing shape. Similarly, while the fitting tube 240 is shown and described as extending from the lower surface 236 of the fitting body 230 along a longitudinal axis 245 of the fitting tube 240, it is understood that the fitting tube 240 may extend along a curve or otherwise non-linearly such that the pressure sensing is tailored for a target application. Furthermore, while the fitting body aperture 232 and fitting tube aperture 242 are shown as coaxially aligned, it is understood that the fitting body aperture 232 and fitting tube aperture 242 may not be coaxial.

While the housing 210 is shown as cylindrical, it is understood that the housing may be oval-shaped, elliptical, polygonal, or otherwise similarly shaped such that the pressure sensing assembly 152 is tailored for a target application. Further, is understood that the inner surface 214 of the housing 210 may have a shape that is different from a shape of the outer surface 212 of the housing.

IV. Second Example Pressure Sensing Assembly

Figure 8:
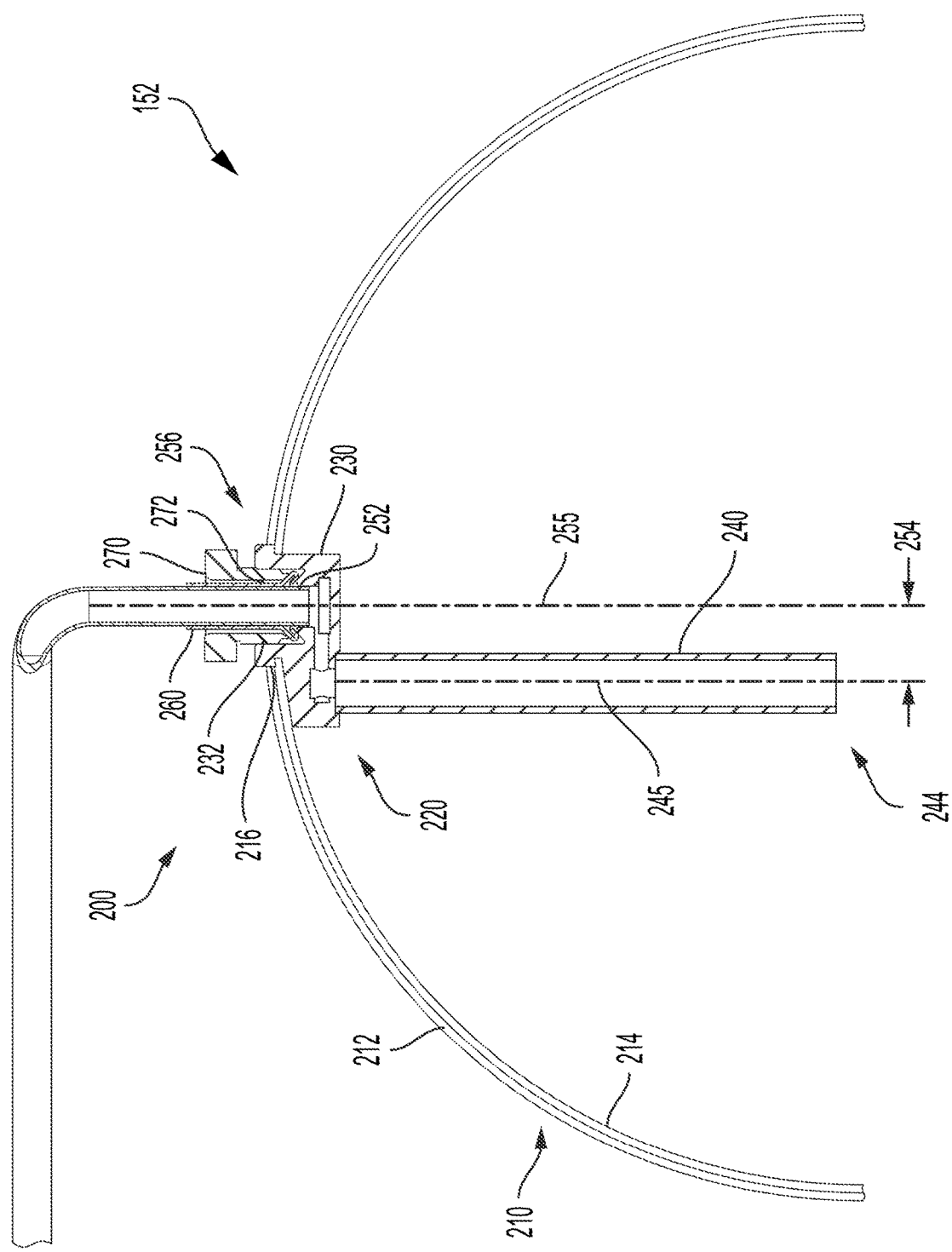
FIG. 8 is a cross-sectional view of a portion of the aftertreatment system shown in FIG. 2, according to various embodiments.
Figure 9:
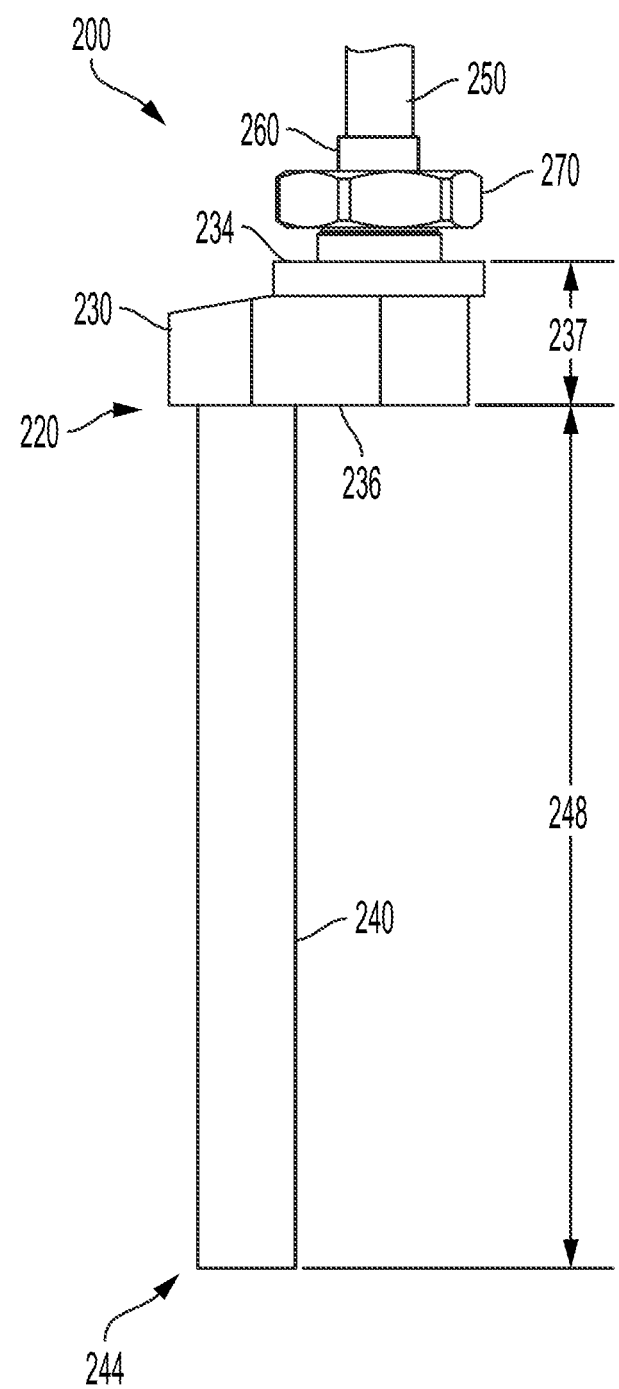
FIG. 9 is a side view of a portion of the tube assembly shown in FIG. 8.
Figure 10:
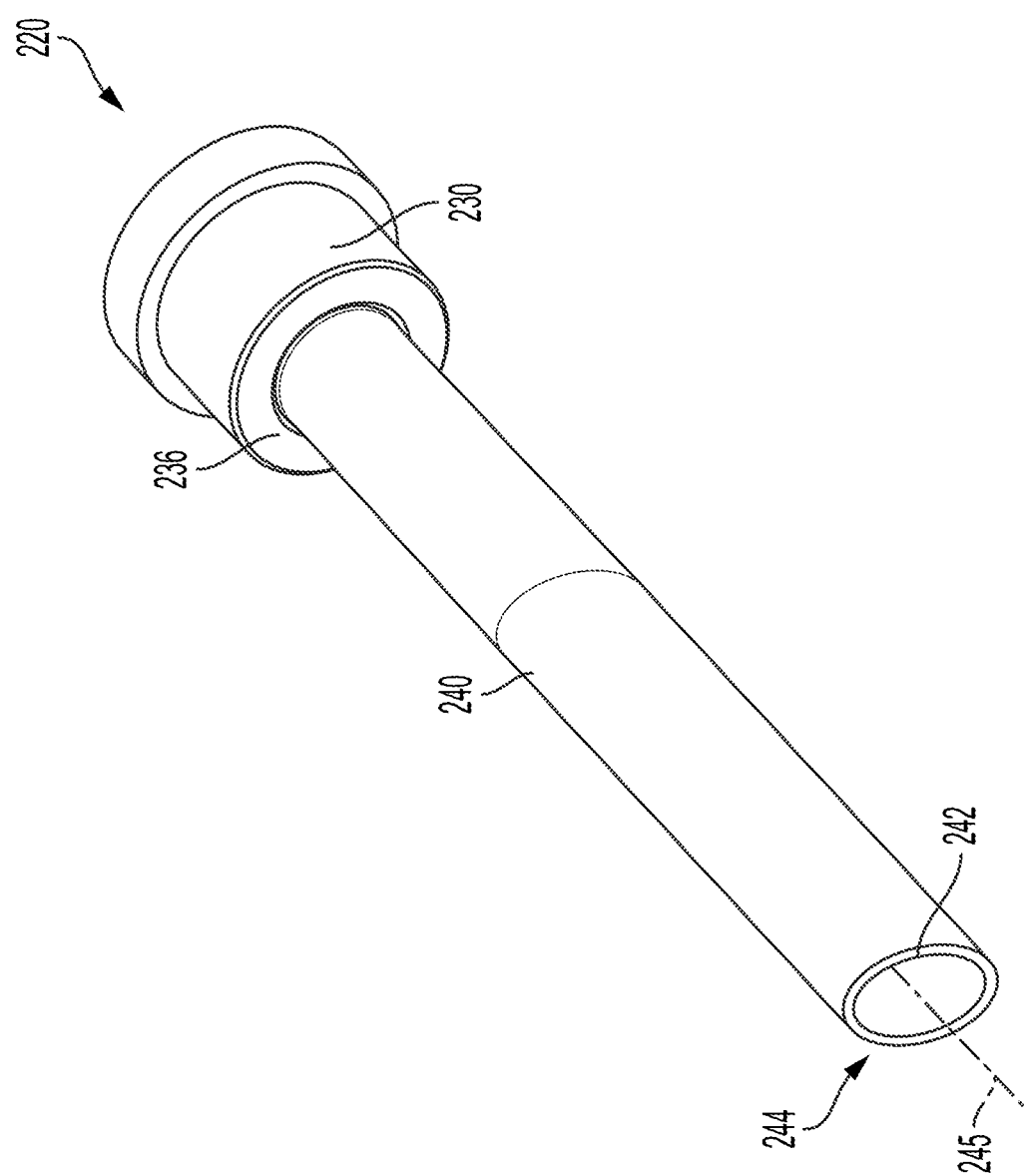
FIG. 10 is a perspective view of another example fitting assembly for a tube assembly.
Figure 12:
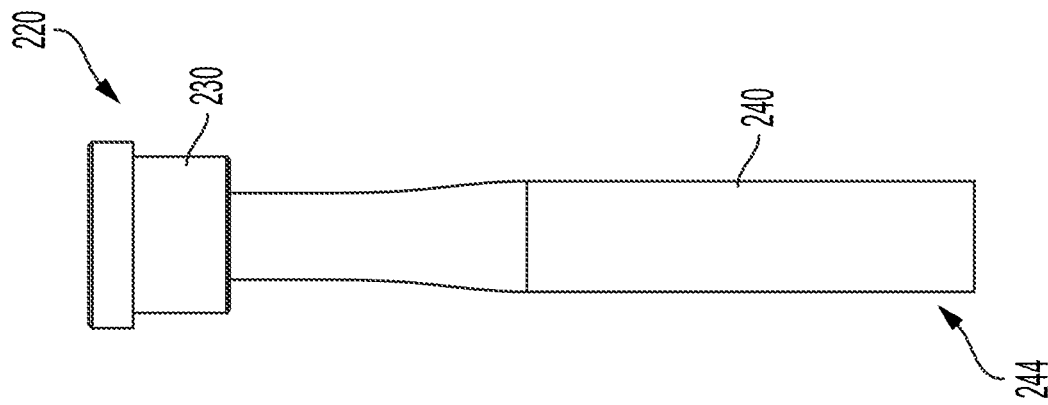
FIG. 12 is a front view of the fitting assembly shown in FIG. 10.
Figure 13:
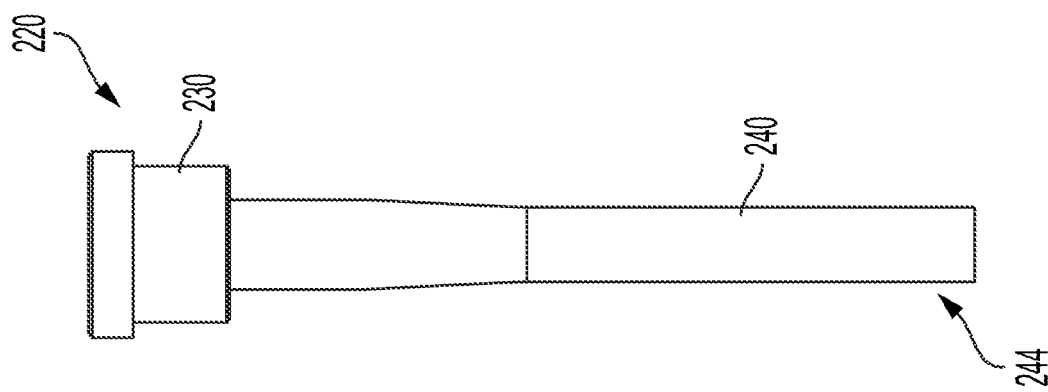
FIG. 13 is a side view of the fitting assembly shown in FIG. 10.
Figure 11:
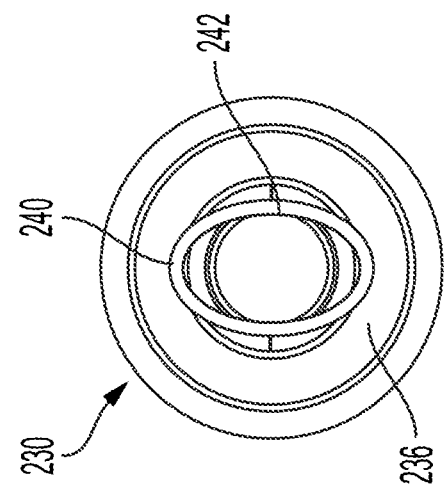
FIG. 11 is a bottom view of the fitting assembly shown in FIG. 10.

FIGS. 8 and 9 illustrate an example pressure sensing assembly 152. The foregoing description of the pressure sensing assembly 152 with respect to FIGS. 2-7 similarly applies to the pressure sensing assembly 152 illustrated in FIGS. 8 and 9.

The pressure sensing assembly 152 is configured such that the conveying tube aperture 252 is not axially aligned with the fitting tube aperture 242. The longitudinal axis 245 of the fitting tube 240 is parallel to a center axis 255 of the conveying tube 250. The longitudinal axis 245 of the fitting tube 240 is radially offset from the center axis 255 of the conveying tube 250 by an offset length 254 within the housing 210. In some applications, space constraints around the housing 210, such another component, may prevent the conveying tube 250 from sampling the exhaust gas at a desired location. The offset length 254 allows the conveying tube to sampling at the desired location. Further, the offset length 254 allows for the pressure sensing assembly 152 to be accessible with different serviceable locations and allows for the pressure sensing assembly 152 to be used with various exhaust aftertreatment systems (e.g., such as the aftertreatment system 100). For example, it may be desirable for the conveying tube 250 to be serviceable at a location along the housing 210 that has been designed to accommodate a pressure sensor. It may also be desirable for the fitting assembly 220 to sample at a different location within the housing 210.

As shown in FIGS. 8 and 9, the fitting body 230 is positioned within a peripheral wall aperture 216 and coupled to the outer surface 212 of the housing 210. The peripheral wall aperture 216 may be located at a location along the peripheral wall of the housing 210 chosen for serviceability. The fitting body 230 includes a conduit (e.g., tube, channel, passage, etc.) that routes exhaust gas between the fitting tube 240 and the conveying tube 250. The fitting tube 240 extends from the fitting body 230 into a sampling location within the passage of the housing 210 and is fluidly coupled to the conveying tube 250 via the fitting body 230. In some embodiments, the conduit is space within the fitting body 230. In some embodiments, the conduit can be separate component that is disposed within the fitting body 230. The fitting body 230 also defines the fitting body height 237 from the upper surface 234 to the lower surface 236. The fitting body height 237 is sized such that the conduit can be disposed or defined within the fitting body 230.

V. First Example Fitting Assembly

FIGS. 10-18 illustrate examples of fitting assemblies 220 and/or fitting tubes 240 of the tube assembly 200 with various cross-sections of the fitting tube 240 taken along a plane perpendicular to the longitudinal axis 245 of the fitting tube 240, according to various embodiments. The foregoing description of the fitting assembly 220 of the pressure sensing assembly 152 with respect to FIGS. 2-7 similarly applies to the fitting assembly 220 illustrated in FIGS. 6-9. Different cross-sections of the fitting tube 240 can be used depending on desired sensor performance, qualities (e.g., velocity, temperature, etc.) of the exhaust gas, size limitations associated with the DPF 106, and/or the like.

FIGS. 10-13 illustrate an example fitting assembly 220 configured such that the fitting tube 240 has a non-constant cross-sectional shape. Unlike in FIGS. 2-7, the fitting tube 240 has a circular cross-sectional shape proximate to the fitting body 230 and transitions to an oval cross-sectional shape at the inner end 244. In some embodiments, the circumference of the oval cross-sectional shape is substantially the same as the circumference of the circular cross-sectional shape. The fitting tube 240 may be configured such that the major axis of the oval is along the direction of the flow of exhaust gas. As a result of the oval cross-section, exhaust gas may flow more smoothly around the fitting tube 240 and reduce backpressure, thereby improving engine efficiency. Further, the uniform circular cross-section proximate the fitting body 230 may allow for the fitting body 230 and the fitting tube 240 to be more easily joined (e.g., via welding, via soldering, via brazing, etc.).

Figure 14:
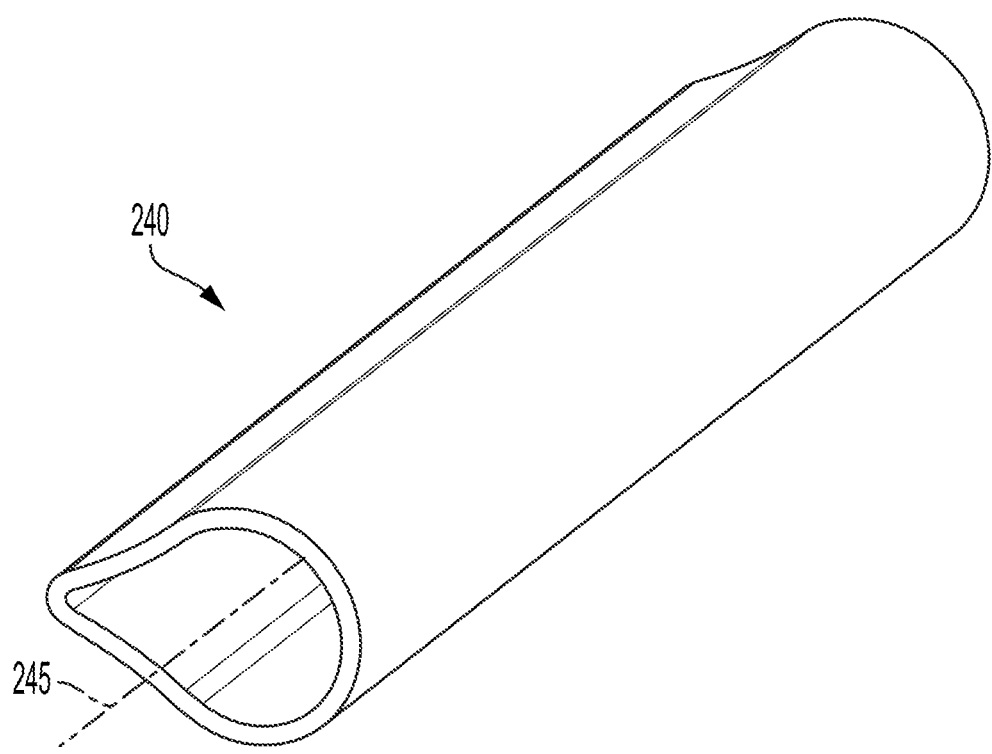
FIG. 14 is a perspective view of an example fitting tube for a fitting assembly.
Figure 15:
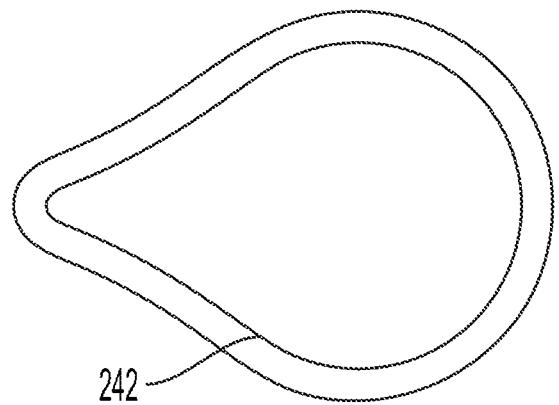
FIG. 15 is a bottom view of the fitting tube shown in FIG. 14.

FIGS. 14 and 15 illustrate an example fitting tube 240 configured such that the fitting tube 240 has a teardrop cross-sectional shape. The fitting tube 240 has a teardrop cross-sectional shape along the length of the fitting tube 240. The teardrop shape can be configured to reduce flow separation of the exhaust gas as it flows around the fitting tube 240. Reducing flow separation around the fitting tube 240 results in a reduction of turbulent flow downstream from the fitting tube 240, which may be advantageous for sensing various characteristics of the exhaust gas downstream. As a result of reducing turbulent flow, backpressure that may be caused by the fitting tube 240 is reduced as well. In some embodiments, the teardrop shape includes a circular portion and a tapered portion.

Figure 16:
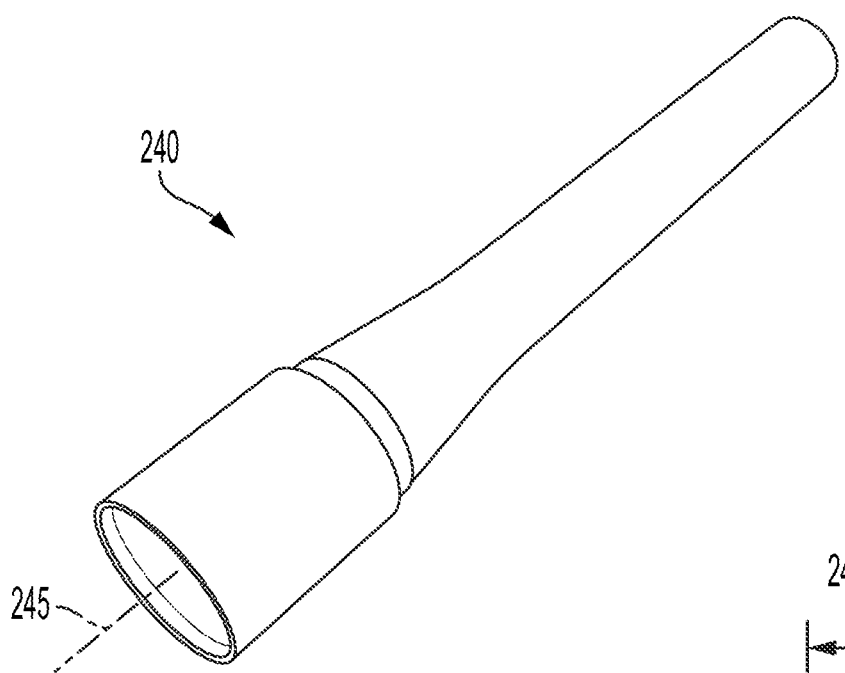
FIG. 16 is a perspective view of another example fitting tube for a fitting assembly.
Figure 17:
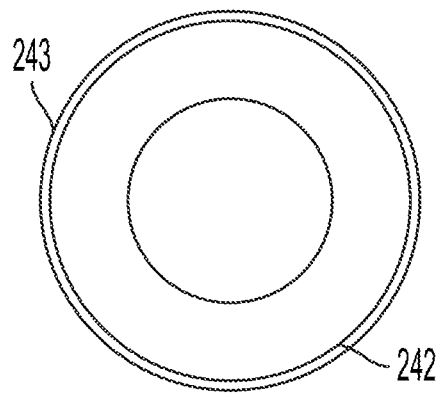
FIG. 17 is a bottom view of the fitting tube shown in FIG. 16.
Figure 18:
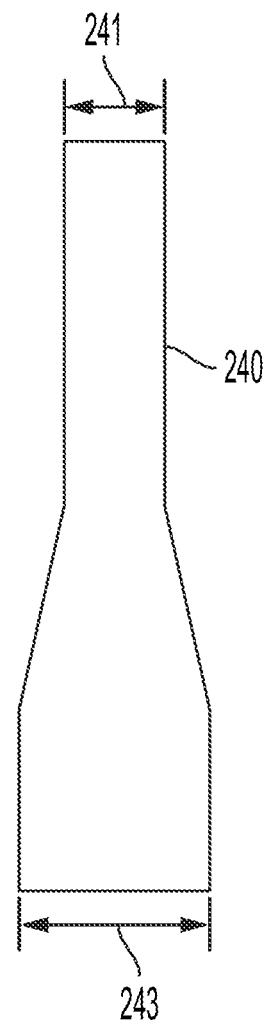
FIG. 18 is a side view of the fitting tube shown in FIG. 16.

FIGS. 16-18 illustrate an example fitting tube 240 configured such that the fitting tube 240 is tapered. The fitting tube 240 has circular cross-sectional shape with a first diameter 241 at a location along the longitudinal axis 245 of the fitting tube 240 proximate to the fitting body 230 and transitions to second diameter 243 at a location opposite the first location. The first diameter 241 is less than the second diameter 243. As a result of the second diameter 243 at the inner end 244 of the fitting tube 240 being greater, the fitting tube aperture 242 is more open to exhaust, which may further decrease deposit format formation. In some embodiments, the first diameter may be greater than the second diameter.

VI. Second Example Fitting Assembly

FIGS. 19-24 illustrate examples of fitting assemblies 220 of the tube assembly 200 with various fitting tubes 240 extending away non-linearly from the lower surface 236 of the fitting body 230, according to various embodiments. The foregoing description of the fitting assembly 220 of the pressure sensing assembly 152 with respect to FIGS. 2-7 similarly applies to the fitting assembly 220 illustrated in FIGS. 19-24. In some applications, a straight fitting tube 240 may not be feasible due to space constraints in the housing 210. In some embodiments, the fitting tubes 240 include curved portions and/or bent portions to accommodate the geometry of the DPF 106. The fitting tubes 240 can include curved portions and/or bent portions that allow for the fitting tube 240 to target a specific sampling location within the passage of the housing 210. Targeting a sampling location within the passage allows for the pressure in a specific area to be measured and monitored.

Figure 19:
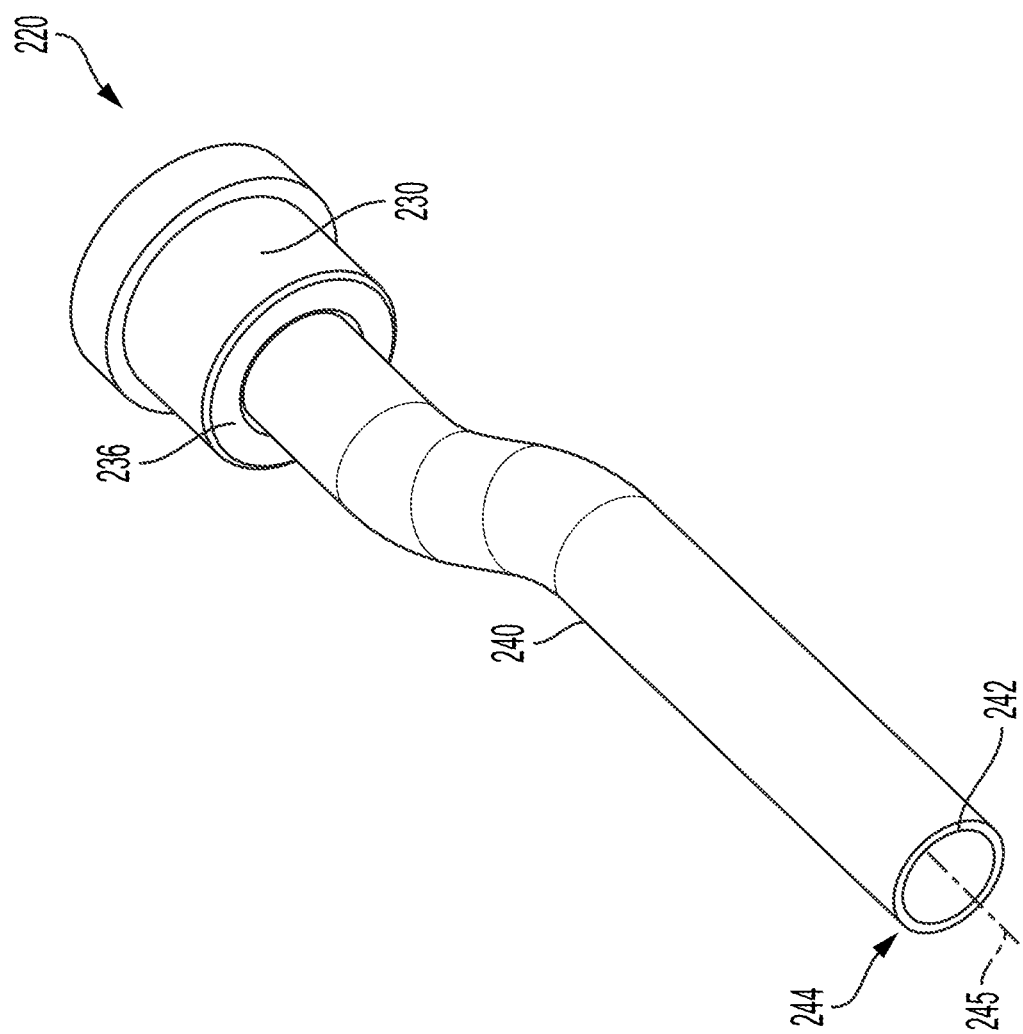
FIG. 19 is a perspective view of another example fitting assembly for a tube assembly.
Figure 21:
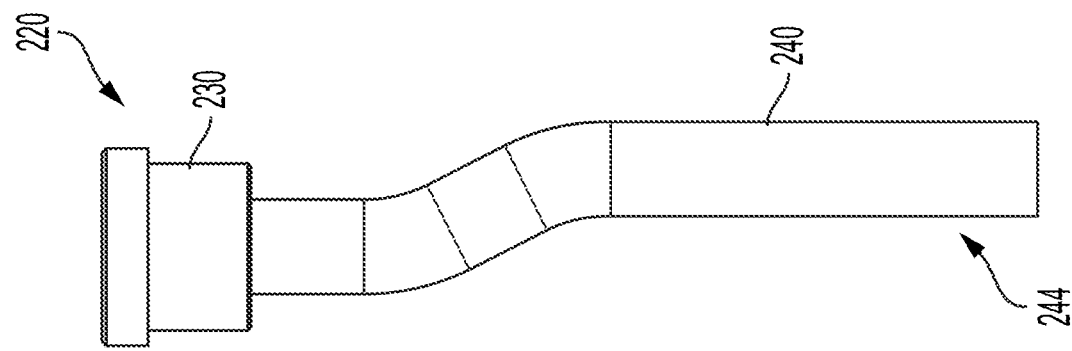
FIG. 21 is a side view of the fitting assembly shown in FIG. 19.
Figure 20:
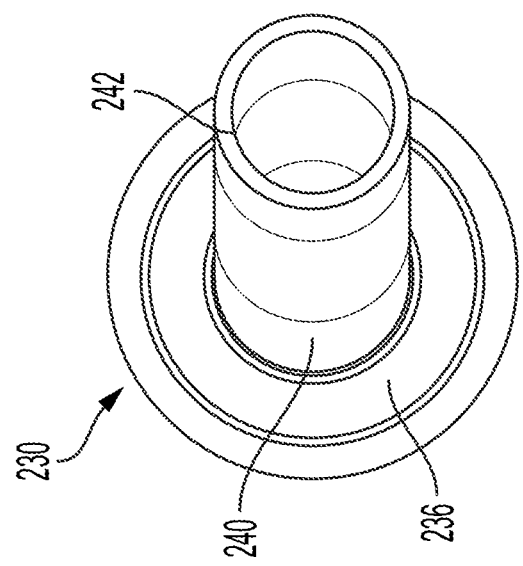
FIG. 20 is a bottom view of the fitting assembly shown in FIG. 19.

FIGS. 19-21 illustrate an example fitting assembly 220 configured such that the fitting tube 240 defines a first linear portion, a bent portion, and a second linear portion. The first linear portion extends linearly away from the fitting body 230 such that a central axis of the first linear portion is coaxial with the fitting body aperture 232. The bent portion is contiguous with the first linear portion and the second linear portion and fluidly couples the second linear portion with the first linear portion and thus the fitting body aperture 232. The second linear portion extends away from the bent portion, opposite the first linear portion. The longitudinal axis of the second linear portion is parallel to a central axis of the first linear portion. The longitudinal axis of the second linear portion is offset from the central axis of the first linear portion in a direction perpendicular to the longitudinal axis. The length of the first linear portion and the second linear portion may depend on the location of the bent portion. For example, if the bent portion is nearer to the fitting body 230 than to the inner end 244, the second linear portion is longer than the first portion. If the bent portion is nearer to the inner end 244 of the fitting tube 240 than to the fitting body 230, the first linear portion can be longer than the second portion. In some embodiments, the lengths of the first linear portion and the second linear portion are equal. In some embodiments, the fitting tube 240 defines only a bent portion and at most one of the first linear portion and the second linear portion.

FIGS. 22-24 illustrate an example fitting assembly 220 configured such that the fitting tube 240 defines a linear portion and a curved portion. In some embodiments, the fitting tube 240 defines only a curved portion. The first linear portion extends away from the central axis of the fitting body aperture 232 of the fitting body 230. The first linear portion is contiguous with the curved portion, the curved portion extends away from the first linear portion opposite to the fitting body 230. In some embodiments, the curved portion curves in the same direction as the exhaust gas flows so that the fitting tube aperture 242 is downstream of the exhaust gas.

VII. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, exhaust gas, liquid reductant, gaseous reductant, aqueous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item unless specifically stated to the contrary.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W to P, etc.) herein are inclusive of their maximum values and minimum values (e.g., W to P includes W and includes P, etc.), unless otherwise indicated. Furthermore, a range of values (e.g., W to P, etc.) does not necessarily require the inclusion of intermediate values within the range of values (e.g., W to P can include only W and P, etc.), unless otherwise indicated.

What is claimed is:

1. An aftertreatment system comprising:
   a housing having a peripheral wall, the peripheral wall having an outer surface and an inner surface, the inner surface defining a passage configured to receive a flow of exhaust gas, the peripheral wall comprising a peripheral wall aperture; and
   a tube assembly for pressure sensing, the tube assembly comprising:
      a fitting assembly comprising:
         a fitting body comprising a fitting body aperture, an upward-facing surface, and a downward-facing surface, the fitting body inserted within the peripheral wall aperture and coupled to the outer surface, and
         a fitting tube extending from the downward-facing surface and disposed in the passage, the fitting tube comprising a fitting tube aperture at an inner end of the fitting tube, and
      a conveying tube positioned partially within the fitting body aperture and extending outward from the fitting body, the conveying tube comprising a conveying tube aperture at an inner end of the conveying tube.

2. The aftertreatment system of claim 1, wherein the inner end of the fitting tube is separated from the inner surface by a distance between 20% and 80% of a width of the passage.

3. The aftertreatment system of claim 1, wherein a length of the fitting tube along a longitudinal axis of the fitting tube is greater than a distance between the upward-facing surface and the downward-facing surface.

4. The aftertreatment system of claim 1, further comprising:
   a coupling tube disposed around the conveying tube, the coupling tube comprising a flared end; and
   a nut disposed between the coupling tube and the fitting body, the nut threadably coupled to the fitting body and compressing the flared end against the fitting body.

5. The aftertreatment system of claim 1, wherein at least one of:
   the fitting tube is integrally formed with the fitting body;
   the fitting tube is threadably coupled to the fitting body;
   the fitting tube is welded to the fitting body;
   the fitting tube is brazed to the fitting body; or
   the fitting tube is press fit into the fitting body.

6. The aftertreatment system of claim 1, wherein the fitting tube has a longitudinal axis, and the fitting tube has an oval shape along a cross-section of the fitting tube taken perpendicular to the longitudinal axis.

7. The aftertreatment system of claim 1, wherein:
   the fitting tube is defined by a first diameter at a first location proximate the fitting body and a second diameter at a second location opposite the first location; and
   the first diameter is different from the second diameter.

8. A tube assembly for pressure sensing, the pressure sensing tube assembly comprising:
   a fitting assembly comprising:
      a fitting body comprising a fitting body aperture, an upward-facing surface, and a downward-facing surface, and
      a fitting tube extending from the downward-facing surface, the fitting tube comprising a fitting tube aperture at an inner end of the fitting tube, the inner end distal the fitting body;
   a coupling tube comprising a flared end; and
   a nut disposed between the coupling tube and the fitting body, the nut configured to be threadably coupled to the fitting body so as to compress the flared end against the fitting body.

9. The tube assembly of claim 8, wherein a length of the fitting tube along a longitudinal axis of the fitting tube is greater than a distance between the upward-facing surface and the downward-facing surface.

10. The tube assembly of claim 8, wherein the fitting tube aperture is aligned with the fitting body aperture at the inner end of the fitting tube.

11. The tube assembly of claim 8, further comprising:
    a conveying tube configured to be positioned partially within the fitting body aperture, the conveying tube comprising a conveying tube aperture configured to sample exhaust gas; and
    a pressure sensor coupling configured to be coupled to the conveying tube, the pressure sensor coupling comprising a pressure sensor coupling opening configured to receive a pressure sensor.

12. The tube assembly of claim 8, wherein at least one of:
    the fitting tube is integrally formed with the fitting body;
    the fitting tube is threadably coupled to the fitting body;
    the fitting tube is welded to the fitting body;
    the fitting tube is brazed to the fitting body; or
    the fitting tube is press fit into the fitting body.

13. The tube assembly of claim 8, wherein the fitting tube has a longitudinal axis, and the fitting tube has an oval shape along a cross-section of the fitting tube taken perpendicular to the longitudinal axis.

14. The tube assembly of claim 8, wherein:
    the fitting tube is defined by a first diameter at a first location proximate the fitting body and a second diameter at a second location opposite the first location; and
    the first diameter is different from the second diameter.

15. A fitting assembly for a tube assembly for pressure sensing, the fitting comprising:
    a fitting body comprising:
       a fitting body aperture that is not threaded,
       an upward-facing surface,
       a downward-facing surface, and
       an inner surface comprising a fitting threaded portion;
    a fitting tube extending from the downward-facing surface of the fitting body, the fitting tube comprising a fitting tube aperture at an inner end of the fitting tube, the inner end distal the fitting body; and
    a nut comprising:
       a nut insert portion comprising a nut threaded portion that is configured to be threadably coupled to the fitting threaded portion, and
       a nut aperture that is not threaded and is configured to be aligned with the fitting body aperture when the nut threaded portion is threadably coupled to the fitting threaded portion.

16. The fitting assembly of claim 15, wherein a length of the fitting tube along a longitudinal axis of the fitting tube is greater than a distance between the upward-facing surface and the downward-facing surface.

17. The fitting assembly of claim 15, wherein the fitting tube aperture is aligned with the fitting body aperture at the inner end of the fitting tube.

18. The fitting assembly of claim 15, wherein at least one of:
    the fitting tube is integrally formed with the fitting body;

the fitting tube is threadably coupled to the fitting body;
the fitting tube is welded to the fitting body;
the fitting tube is brazed to the fitting body; or
the fitting tube is press fit into the fitting body.

19. The fitting assembly of claim 15, wherein the fitting tube has a longitudinal axis, and the fitting tube has an oval shape along a cross-section of the fitting tube taken perpendicular to the longitudinal axis.

20. The fitting assembly of claim 15, wherein:
the fitting tube is defined by a first diameter at a first location proximate the fitting body and a second diameter at a second location opposite the first location; and
the first diameter is different from the second diameter.

* * * * *